(12) United States Patent
Reinsel et al.

(10) Patent No.: US 12,118,672 B1
(45) Date of Patent: Oct. 15, 2024

(54) THREE DIMENSIONAL REPRESENTATION OF SPORTS DATA FROM MULTIPLE SOURCES

(71) Applicant: DATRAKS, LLC, Orlando, FL (US)

(72) Inventors: Ryan James Reinsel, Irvine, CA (US); Matthew Kenneth Schafer, Rancho Santa Margarita, CA (US); Eric Edward Albers, Chesapeake City, MD (US); Joseph Eli Sleiman, Windermere, FL (US); Kevin Davidson, Longwood, FL (US)

(73) Assignee: DATRAKS, LLC, Orlando, FL (US)

( * ) Notice: Subject to any disclaimer, the term of this patent is extended or adjusted under 35 U.S.C. 154(b) by 197 days.

(21) Appl. No.: 17/939,322

(22) Filed: Sep. 7, 2022

(51) Int. Cl.
*G06T 19/00* (2011.01)
*G06F 16/28* (2019.01)
*G06V 20/40* (2022.01)

(52) U.S. Cl.
CPC ............ *G06T 19/00* (2013.01); *G06F 16/287* (2019.01); *G06V 20/42* (2022.01)

(58) Field of Classification Search
CPC ........ G06T 19/00; G06F 16/287; G06V 20/42
See application file for complete search history.

(56) References Cited

U.S. PATENT DOCUMENTS

2009/0029754 A1* 1/2009 Slocum .............. A63B 24/0087
463/32
2016/0292881 A1* 10/2016 Bose ...................... G11B 27/10
2019/0087661 A1* 3/2019 Lee ......................... G06V 10/82
2021/0069550 A1* 3/2021 Clark .................. A63B 71/0622
2021/0081674 A1* 3/2021 Bauer .................... G06V 20/42

OTHER PUBLICATIONS

Theobalt, Christian, et al. "Pitching a baseball: tracking high-speed motion with multi-exposure images." ACM SIGGRAPH 2004 Papers. 2004. 540-547. (Year: 2004).*
Sicat, Ronell, et al. "DXR: A toolkit for building immersive data visualizations." IEEE transactions on visualization and computer graphics 25.1 (2018): 715-725. (Year: 2018).*
Bai, Ying-Wen, and I-Hsun Hsieh. "Using a wearable device to assist the training of the throwing motion of baseball players." 2019 IEEE Canadian Conference of Electrical and Computer Engineering (CCECE). IEEE, 2019. (Year: 2019).*
Bahill, A. Terry, and David G. Baldwin. "Describing baseball pitch movement with right-hand rules." Computers in Biology and Medicine 37.7 (2007): 1001-1008. (Year: 2007).*

* cited by examiner

*Primary Examiner* — Daniel F Hajnik
(74) *Attorney, Agent, or Firm* — ALBERT BORDAS P.A.

(57) ABSTRACT

A three dimensional representation of sports data from multiple sources, which has A) a computer program stored on a non-transitory computer readable medium, B) a server operatively associated with the non-transitory computer readable medium, C) a computer vision model using feature detection algorithms, D) a database associated to the computer vision model, E) data to upload to the database, F) a graphical user interface to show data, and G) a computer device, whereby users access to the graphical user interface to upload and visualize the data. The data is visually shown through two-dimension and three-dimension images, text, numbers, animations, and custom visuals to allow the users to analyze the data.

18 Claims, 12 Drawing Sheets
(7 of 12 Drawing Sheet(s) Filed in Color)

Seam's Pitch value set to 30 degrees

Fingerprint moved to 30p, 60y

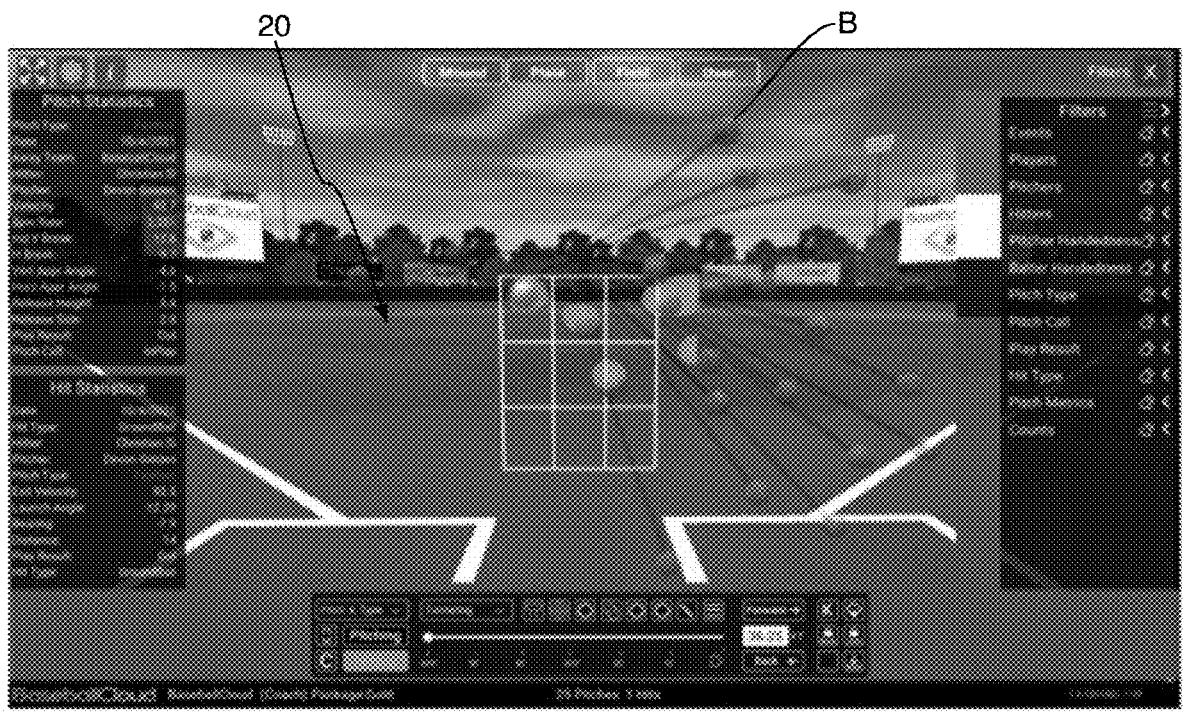
Fig. 6
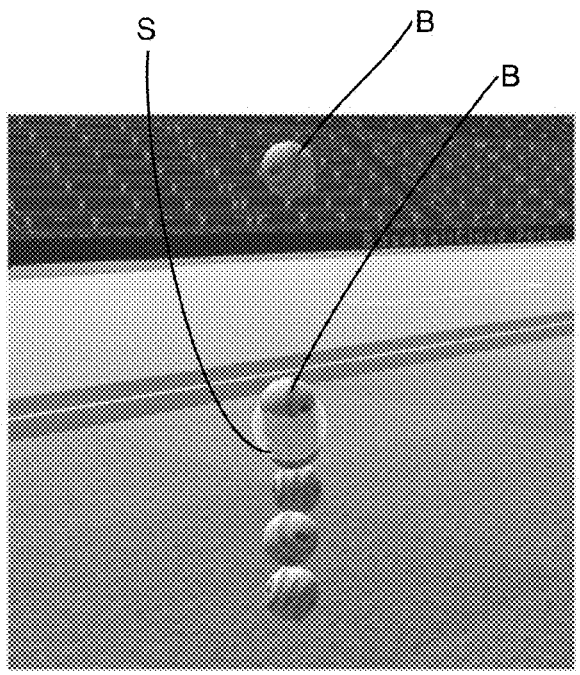 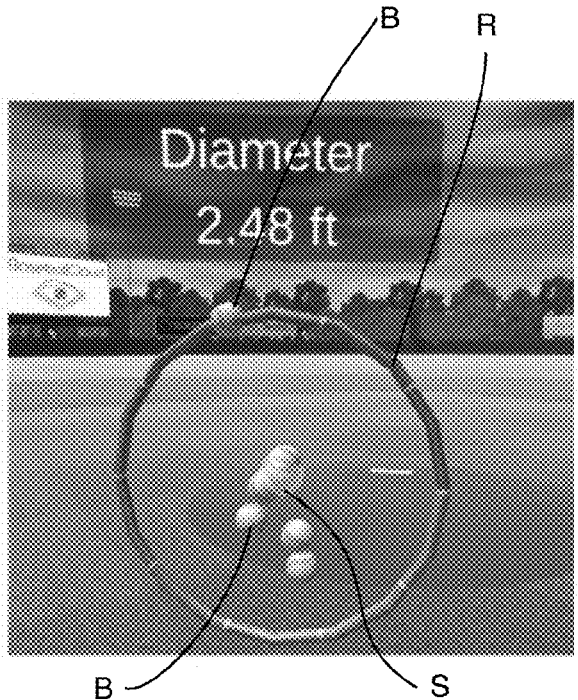
Fig. 7A  Fig. 7B

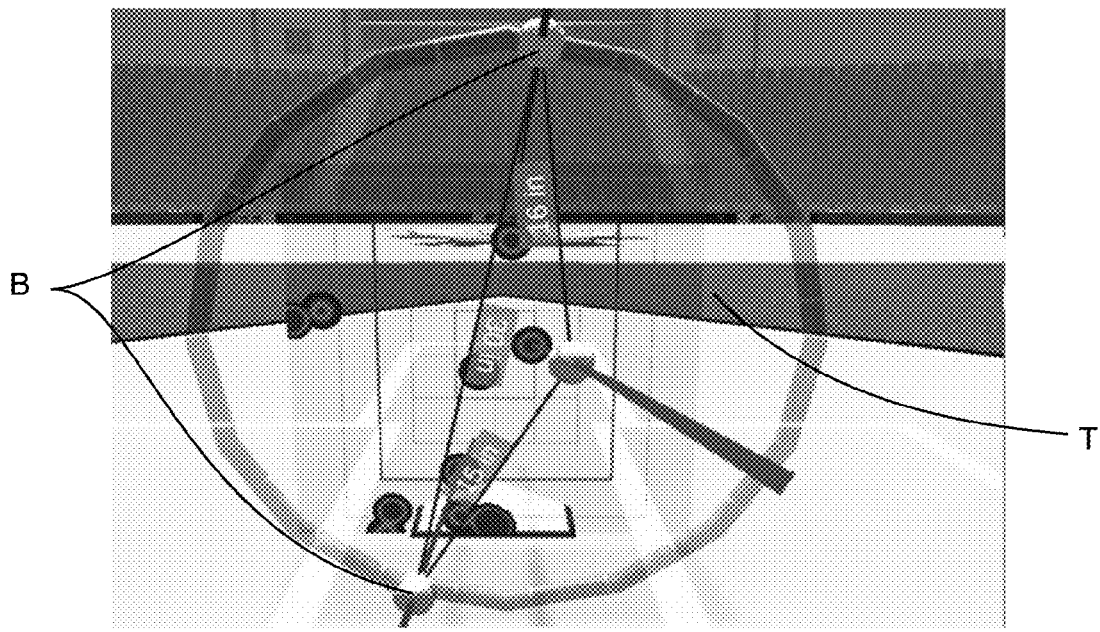
Fig. 12
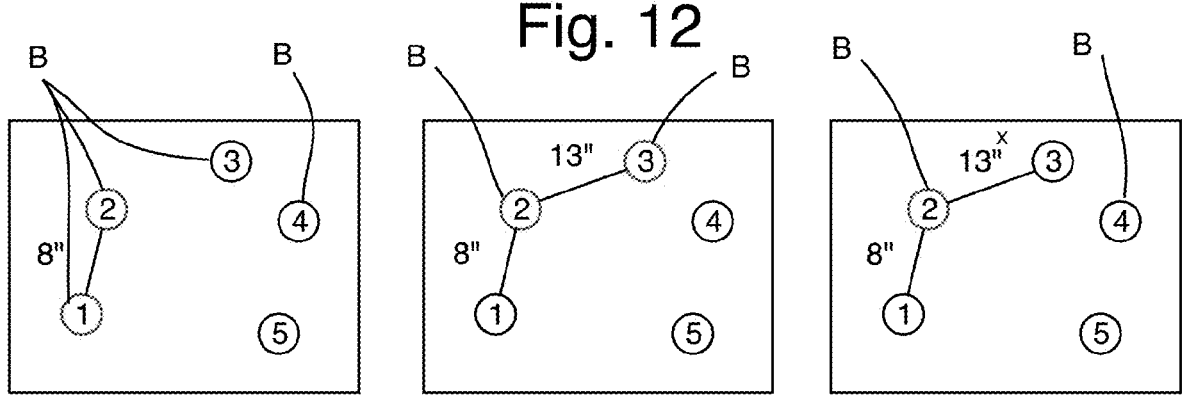
Fig. 13A　　　　Fig. 13B　　　　Fig. 13C
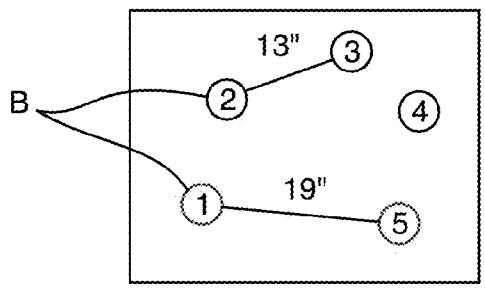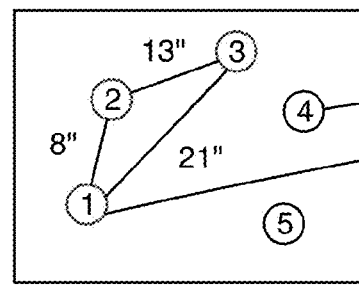
Fig. 13D　　　　Fig. 13E

THREE DIMENSIONAL REPRESENTATION OF SPORTS DATA FROM MULTIPLE SOURCES

BACKGROUND OF THE INVENTION

1. Field of the Invention

The present invention relates to data analysis systems, and more particularly, to three dimensional representations of sports data from at least one source.

2. Description of the Related Art

Applicant is not aware of any three dimensional representations of sports data from multiple sources having the novel features of the present invention.

SUMMARY OF THE INVENTION

The present invention is a three dimensional representation of sports data from multiple sources, comprising: A) a computer program stored on a non-transitory computer readable medium, B) a server operatively associated with the non-transitory computer readable medium, C) a computer vision model using feature detection algorithms, D) a database associated to the computer vision model, E) data to upload to the database, F) a graphical user interface to show data, and G) a computer device, whereby users access to the graphical user interface to upload and visualize the data.

The data is from an optical and radar tracking systems. The data is also from multiple data sources selected from the group consisting of radar-detected ball flight, optical-tracked ball flight, wearable and non-wearable sensors, force-accepting and force-measuring hardware, and marker and markerless biomechanics data captured from optical or other capturing devices. The data is visually shown through two-dimension and three-dimension images, text, numbers, animations, and custom visuals to allow the users to analyze the data. The data comprises video data.

Users are able to pull the data from the database by requesting metric parameters, whereby grips that fit that criteria are shown through a two dimensional and three dimensional grip display. The data from the database passes through the computer vision model to detect hand and fingers position points, spin direction, and seam orientation on a ball. The computer vision model further locates and identifies a gyro degree, and a spin rate of the ball. The computer vision model extracts a location of each individual finger on the ball in relation to the seam orientation and exports the coordinates to the database.

The computer vision model comprises a coordinate system. The coordinate system comprises a method to locate the hand and fingers position points on the ball. The data and the coordinate system are represented on the graphical user interface through a three-dimensional ball having seams. The coordinate system comprises pitch values, and yaw values to act as latitude and longitude markers on the ball. The coordinate system uses three rotations to display the seam orientations in relation to the spin axis of the ball, whereby the pitch values, the yaw values, and turn values are used to rotate the ball around three different axis respectively. When each of the fingers position point is entered in the database, a virtual grip is placed on the ball with the correct spin direction, gyro degree, spin rate, and seam orientation. The users can manually place their fingerprints to create the virtual grip on the ball. Values of distance, angle, surface area, and perimeter of two or more of the finger location points on the ball are measured and calculated. A force applied on the ball is read, whereby a location, pressure values, and heat maps are shown based on the force.

The data is represented in a three-dimensional sport field shown on the graphical user interface for ball trajectory. The data is represented on the graphical user interface through a floating ring or a single ring in two-dimensional form when multiple of the ball trajectory are synced providing diameter, radius, circumference, and area for any group of the ball trajectory or pitches at any point. The data is represented on the graphical user interface through a sphere in a three-dimensional form when multiple of the ball trajectory or pitches are unsynced. The data is further represented on the graphical user interface through a full ring tunnel following a tunneling color scheme for multiple of the pitches synced or unsynced. The user analyzes the data for the ball trajectory represented on the graphical user interface through measurements of the balls according to an intended location and an aim location. The users access to the graphical user interface and upload the data through a computer-based communication. The three-dimensional representation of sports data is shown on web applications, mobile applications, and extended reality devices.

It is therefore one of the main objects of the present invention to provide a three-dimensional representation of sports data from multiple sources.

It is therefore one of the main objects of the present invention to provide a three-dimensional representation of sports data from multiple sources in which the data is represented in a three-dimensional sport field shown on the graphical user interface.

It is therefore one of the main objects of the present invention to provide a three-dimensional representation of sports data from multiple sources, which has a point of contact and 3D grip calculator.

It is another object of this invention to provide a three-dimensional representation of sports data from multiple sources, which utilize a computer vision model using feature detection algorithms.

It is another object of this invention to provide a three-dimensional representation of sports data from multiple sources that can read force applied on the ball and show the location, pressure values, heatmaps, and other visuals based on a data.

It is another object of this invention to provide a three-dimensional representation of sports data from multiple sources that can calculate the correlations between the grip on a ball and the ballistic metrics captured by ball tracking devices to help determine what grips affect the metrics.

It is another object of this invention to provide a three-dimensional representation of sports data from multiple sources, which allow users to pull data from a database by requesting certain metric parameters and show the grips that fit that criteria through a 3D Grip filters and more material.

Further objects of the invention will be brought out in the following part of the specification, wherein detailed description is for the purpose of fully disclosing the invention without placing limitations thereon.

BRIEF DESCRIPTION OF THE DRAWINGS

The patent or application file contains at least one drawing executed in color. Copies of this patent or patent application publication with color drawings will be provided by the Office upon request and payment of the necessary fee.

With the above and other related objects in view, the invention consists in the details of construction and combination of parts as will be more fully understood from the following description, when read in conjunction with the accompanying drawings in which:

FIG. 6 is a graphical representation of ball trajectory in a baseball/softball field.

FIG. 7A is a graphical representation of balls in the baseball/softball field.

FIG. 7B is a graphical representation of a single ring shown for synced pitches to illustrate and compare overall pitch path movement profiles.

FIG. 12 is a graphical representation of measurements inside of tunneling.

FIG. 13A is a representation of a first way of making measurements between balls.

FIG. 13B is a representation of a second way of making measurements between balls.

FIG. 13C is a representation of a way to disconnect connected balls for measurements.

FIG. 13D is a representation of a third way of making measurements between balls.

FIG. 13E is a representation of a wrong way to make measurements between balls.

DETAILED DESCRIPTION OF THE PREFERRED EMBODIMENT

Figure 1:
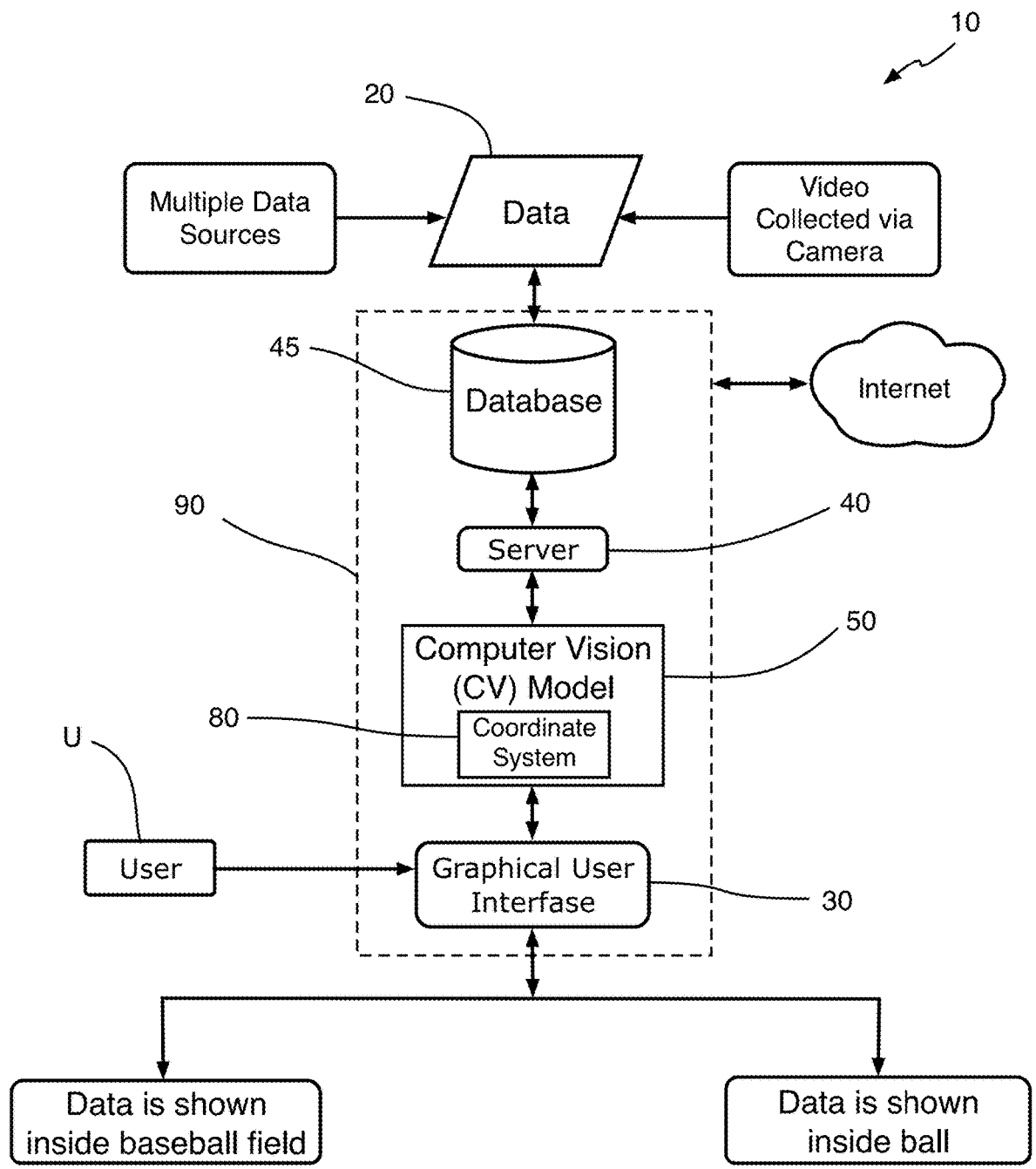
FIG. 1 is a flowchart representing the present invention.

Referring now to the drawings, the present invention is a three dimensional representation of sports data from multiple sources, and is generally referred to with numeral 10.

As seen in FIG. 1, present invention 10 is a system for data visualization, which accepts and shows multiple data sources through a three-dimensional representation of a sports ball B to provide visual context on metrics and movement of ball B. In addition, present invention 10, accepts and visualizes multiple data sources by combining them to recreate an event and includes ball tracking, sensor, force, and motion capture data sources at the same time. These data points are shown on a three-dimensional sports field and allows users U to analyze data 20 together inside of a single application on one screen or graphical user interface 30.

A three dimensional representation of sports data from multiple sources, comprises:
 A) a computer program stored on a non-transitory computer readable medium;
 B) server 40 operatively associated with the non-transitory computer readable medium;
 C) computer vision model 50 using feature detection algorithms;
 D) database 45 associated to computer vision model 50;
 E) data 20 to upload to database 45;
 F) graphical user interface 30 to show data 20; and
 G) a computer device, whereby users U access to graphical user interface 30 to upload and visualize data 20.

Data 20 is from a plurality of sensor systems. In a preferred embodiment, data 20 is from optical and radar tracking systems, whereby data 20 comprises video data.

The optical and radar tracking systems allows user U to see all sides of ball B with a click and drag on the screen, as well as to zoom in and out. Present invention 10 is also able to store multiple pitches at once with the ability to navigate between them, or user U can pull up a side by side of all stored pitches and look at a side by side comparison of each pitch via 2up, 4up, 6up, and arsenal functions. All these balls B can be individually played and paused to show either a stationary ball B or ball B in full motion fully integrated with all the display features discussed earlier.

Present invention 10 displays multiple data sources together to recreate an environment of a pitch or ball. Data captured by a multitude of devices may be combined to show the devices relevant data 20 in the environment or on or around ball B. As envisioned in the present invention 10, devices may sense many types of data including but not limited to Biomechanics data, pitch data, bat swing data, force or impact data on the bat, ball, players or environment, weather or environmental data along with future device sensor data.

Data 20 is from at least one source. In a preferred embodiment, data 20 is from multiple data sources selected from the group consisting of radar-detected ball flight, optical-tracked ball flight, wearable and non-wearable sensors, force-accepting and force-measuring hardware, and marker and markerless biomechanics data captured from optical or other capturing devices. Present invention 10 uses data 20 from multiple hardware devices and brings data 20 into one environment by combining the data sources that were captured during the events. Data 20 is visually shown through two-dimension and three-dimension images, text, numbers, animations, and custom visuals to allow users U to analyze data 20. Data 20 from database 45 passes through computer vision model 50 to detect important features of the environment. Some examples of features environed by the present invention 10 include but are not limited to hand and finger position, ball seam position and orientation, bat swing position and orientation, player and environmental positions and orientations and any other features which may be of interest to user U in the environment. Position and orientation data detected may be presented to the user U in various coordinate systems.

Computer Vision Model 50 may use feature detection algorithms and/or neural networks. Computer vision model 50 further locates and identifies a spin direction, a gyro degree, and a spin rate of the ball. Computer vision model 50 extracts a multitude of parameters of ball B including but not limited to a location of each individual finger on ball B in relation to seam 70 orientation and exports the coordinates to database 45. Computer vision model 50 comprises coordinate system 80. Coordinate system 80 comprises a method to locate the hand and fingers position points on ball B. Optionally, cloud 90 stores computer vision model 50.

Users U access to graphical user interface 30 and upload data 20 through a computer-based communication. Users U access to graphical user interface 30 and upload data 20 locally on a computer/phone/tablet without the need for internet communication. In another embodiment, Users U access to graphical user interface 30 and upload data 20 through an Internet-based communication. The three-dimensional representation of sports data is shown on web applications, mobile applications, and extended reality devices. Users U are able to pull data 20 from database 45 by requesting metric parameters, whereby grips that fit that criterion are shown through a two dimensional and three dimensional grip display.

Filters according to one embodiment of present invention 10 include any data 20 or subset of data 20 which is stored in database 45, including but not limited, to the following examples:
Season
   2021, 2020 . . .
Event
   Lists all events that have been uploaded to cloud 90 that are available to see Pitcher
   All of the pitchers that were in the selected event
Data Source
   The device type that the captured information came from
Pitches From
   Custom Date Range
Pitch Type
   Fastball
   Sinker
   Cutter
   Curveball
   Slider
   Changeup
   Splitter
   Knuckleball Filters according to another embodiment of present invention 10 include any data 20 or subset of data 20, which is stored in database 45, including but not limited, to the following examples:
Events
   This lists all events that have been uploaded to cloud 90 that are available to see
Pitchers
   All of the pitchers that were in the selected event
Hitters
   All of the hitters that were in the selected event
Pitcher Handedness
   RH Pitcher
   LH Pitcher
Hitter Handedness
   RH Hitter
   LH Hitter
Pitch Type
   Fastball
   Sinker
   Cutter
   Curveball
   Slider
   Changeup
   Splitter
   Knuckleball
Pitch Call
   Called Strike
   Ball
   Strike Swinging
   Hit By Pitch
   Foul
   In Play
Play Result
   Out
   Single
   Double
   Triple
   Home Run
Hit Type
   Groundball
   Line Drive
   Fly Ball
   Popup
Pitch Metrics
   Velocity
   Spin Rate
   Vertical Break
   Induced Vertical Break
   Horizontal Break
   Vertical Approach Angle
   Horizontal Approach Angle
   Release Height
   Release Side
   Extension
   Vertical Release Angle
   Horizontal Release Angle
   Exit Velocity
Counts
   0-0
   0-1
   0-2
   1-0
   1-1
   1-2
   2-0
   2-1

2-2
3-0
3-1
3-2

Figure 2:
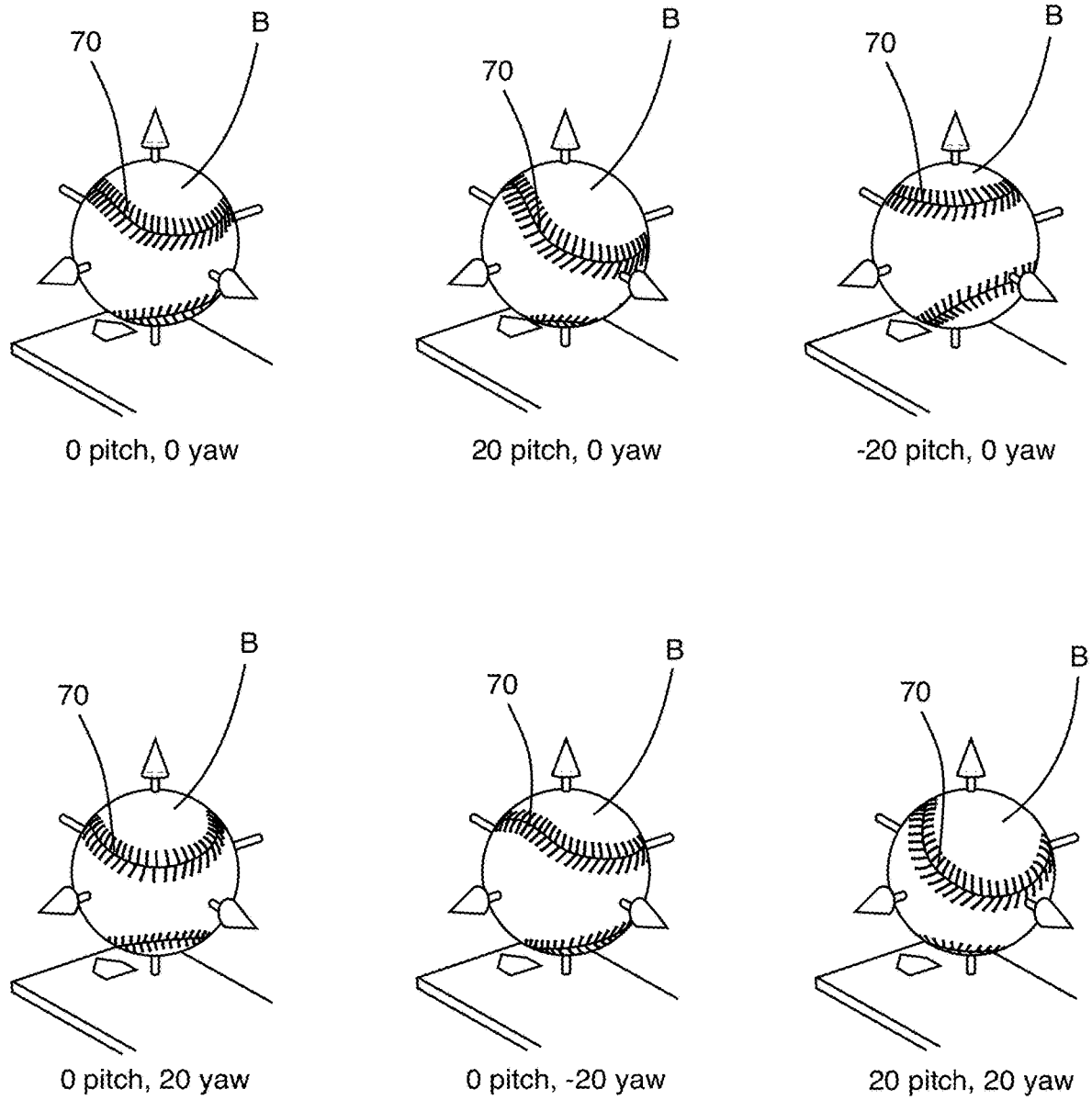
FIG. 2 is a graphical representation of a three-dimensional ball showing pitch and yaw values.

As seen in FIGS. 1 and 2, data 20 and coordinate system 80 are represented on ball B, whereby ball B is a three-dimensional ball shown on graphical user interface 30. Ball B, as represented in graphical user interface 30, comprises seams 70. Coordinate system 80 is displayed over a shell of the entire ball B. Coordinate system 80 comprises pitch values, and yaw values to act as latitude and longitude markers on ball B.

Coordinate system 80 uses three rotations to display seam 70 orientation in relation to the spin axis of ball B, whereby the pitch values, the yaw values, and turn values are used to rotate ball B around three different axis respectively.

The rotations are pitch (P), yaw (Y), and turn (T) and default to 0,0,0, which represents the origin of seams 70. The pitch and yaw values are the 'latitude' and 'longitude' on ball B, where 90p is the top ball B, −90p is the bottom of ball B, Oy is the front of ball B, and +/−180y is the back of ball B (opposite the origin). Any position on ball B can be reached using only the pitch and yaw values.

Longitude (Yaw) ranges from −180 to 180 where 0 represents the line cutting ball B into left and right hemispheres. −180 to 0 represents the left side of ball B with −90 being the leftmost point of ball B. Similarly, 0 to 180 represents the right side of ball B with being the rightmost point of ball B.

The longitude (Yaw) of −180 and 180 are the same place and can be visualized as the back of ball B. These coordinates can be used to describe where a pitcher's fingers are on ball B.

Figure 3:
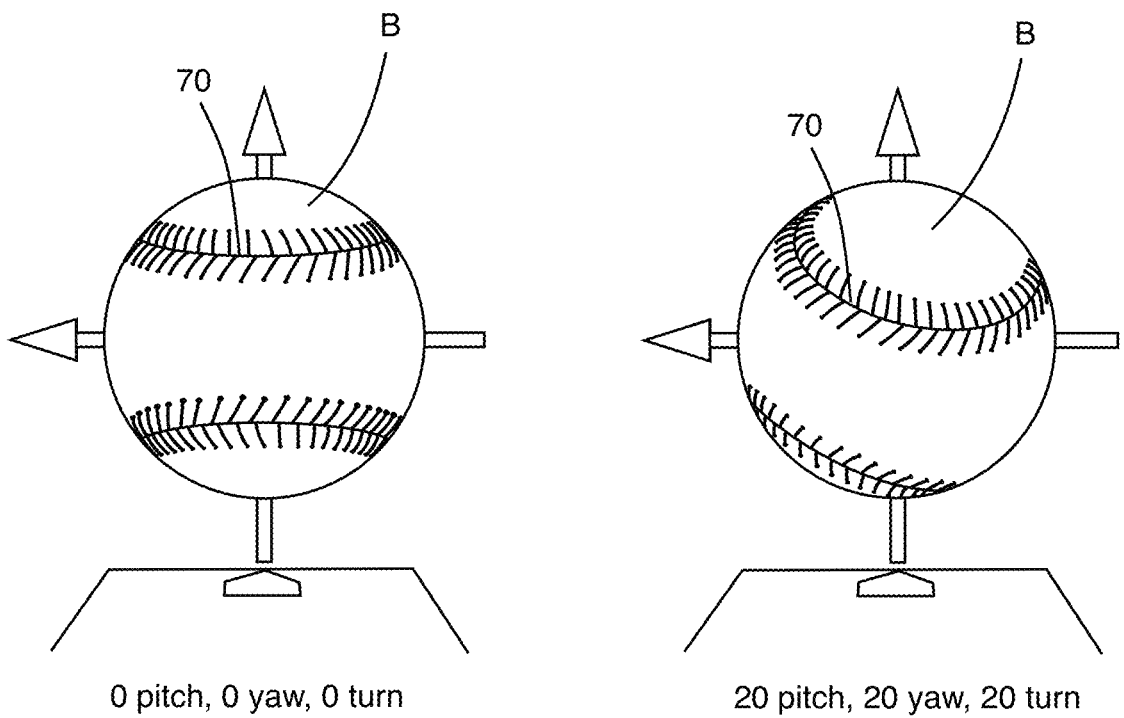
FIG. 3 is a graphical representation of the three-dimensional ball showing pitch, yaw, and turn values.
Figure 4:
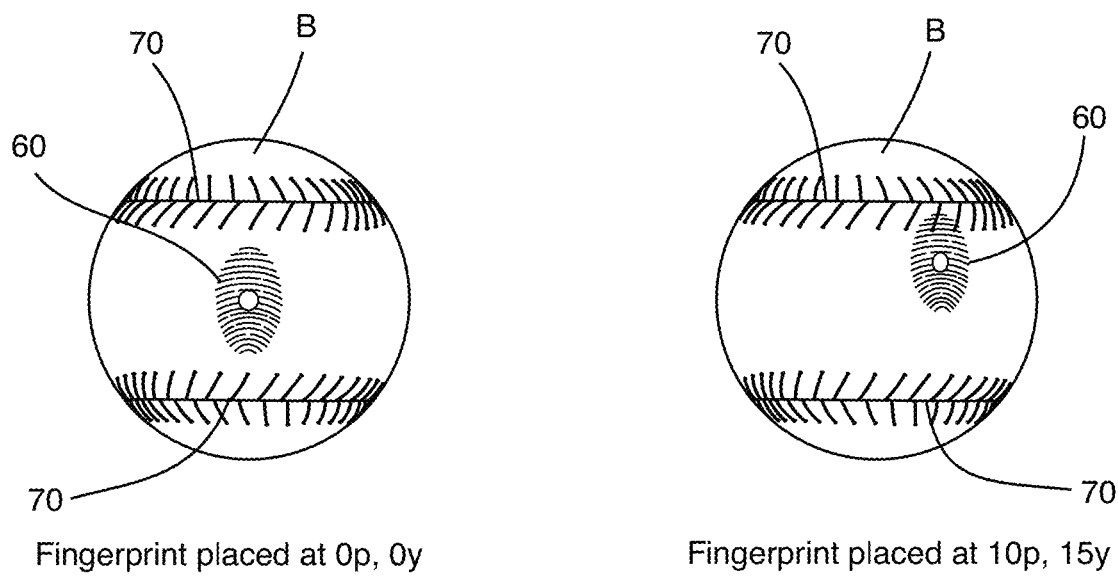
FIG. 4 is a graphical representation of the three-dimensional ball showing a fingerprint.

As seen in FIGS. 3 and 4, present invention 10 provides a point of contact of fingers according seams 70 and a three-dimensional grip calculator. In a preferred embodiment, fingerprints 60 are represented on ball B. In a preferred embodiment fingerprints 60 are from thumb, index, and middle fingers.

In some cases a counter-rotation to the spin axis may be needed to achieve the desired combination of seam 70 orientation and spin axis. To achieve this, the turn value is used, and this value ranges from −180:180 degrees. The turn value represents a rotation of seams 70 around the velocity vector, which is different than the axes of rotation for pitch and yaw.

As seen in FIGS. 4, 4A, 4B, and 4C, present invention 10 further comprises a fingerprint function, wherein user U drag and drop fingers onto ball B, and this can be done with up to five fingers. A graphic is displayed above each fingerprint 60 with its corresponding coordinate to help user U navigate ball B.

In the present invention 10 the position of a finger and fingerprint 60 may be detected and placed onto the surface of ball B by passing various device data, for example camera, radar, or other sensor data through the computer vision model 50. Using these coordinates to describe a pitcher's grip allows computing a few things about their grip. Distances between any two fingers on the surface of ball B, as well as, the angles between fingers on the surface of ball B may are calculated. Present invention 10 may also compute things like surface area and perimeter of polygons generated by the points of contact, whether that is a triangle, quadrilateral, or pentagon.

To position fingerprints 60 on ball B, pitch and yaw values are used as coordinates for each fingerprint 60. Once the spin components and seam 70 orientation have been determined, fingerprints 60 can be placed by finding their respective positions relative to origin of seam 70. Setting P and Y values of fingerprint 60, fingerprint 60 may be placed on ball B relative to the currently set seam 70 orientation. Fingerprints 60 are positioned relative to seam 70 orientation, therefore if seams 70 are changed, fingerprints 60 move with it. Seams 70 are positioned relative to the spin axis, and fingerprints 60 are positioned relative to seam 70 orientation.

Figure 4A:
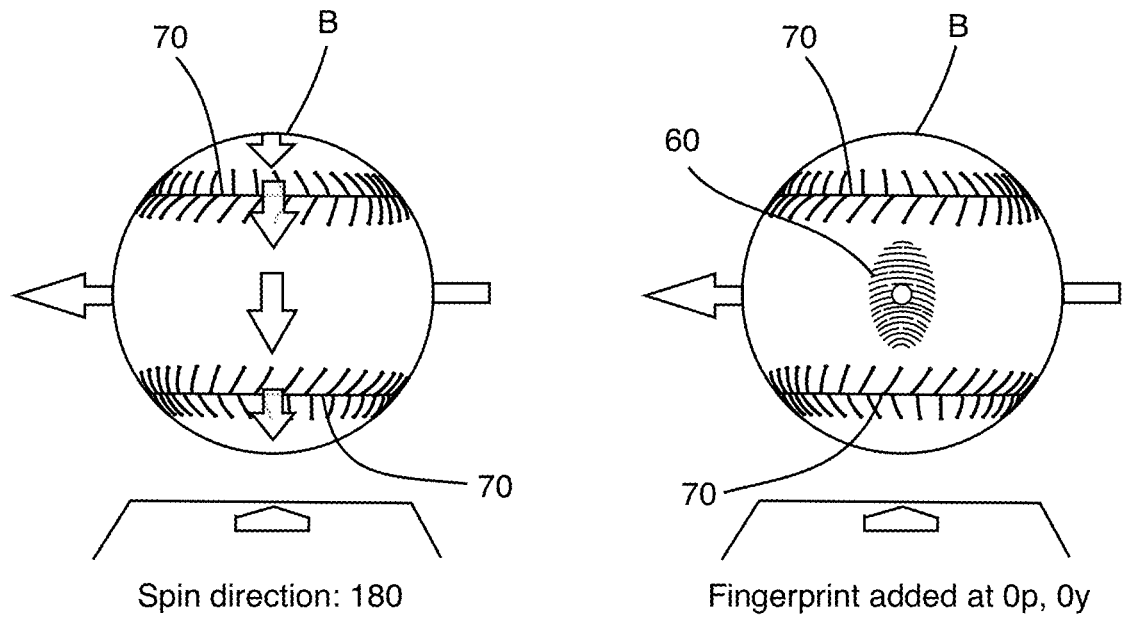
FIG. 4A is a graphical representation of the three-dimensional ball showing a spin direction of the ball and a fingerprint.
Figure 4B:
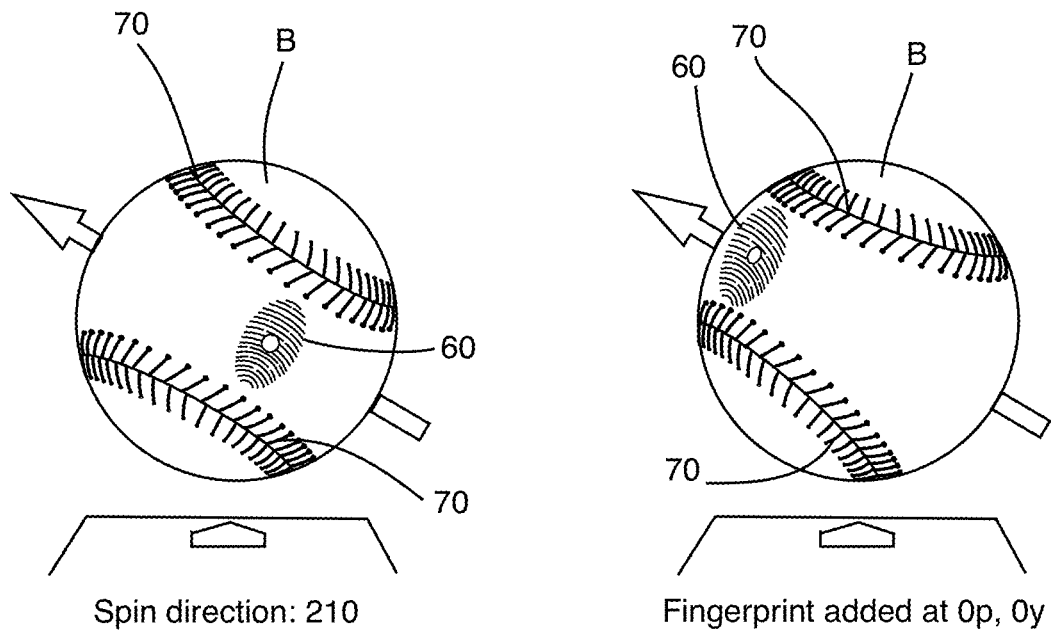
FIG. 4B is a graphical representation of the three-dimensional ball showing other spin directions of the ball and the fingerprint.
Figure 4C:
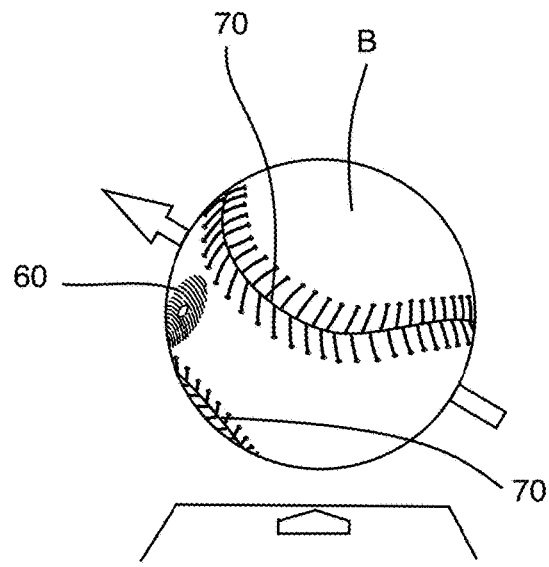
FIG. 4C is a graphical representation of the three-dimensional ball showing a seam's pitch value.
Figure 4C:
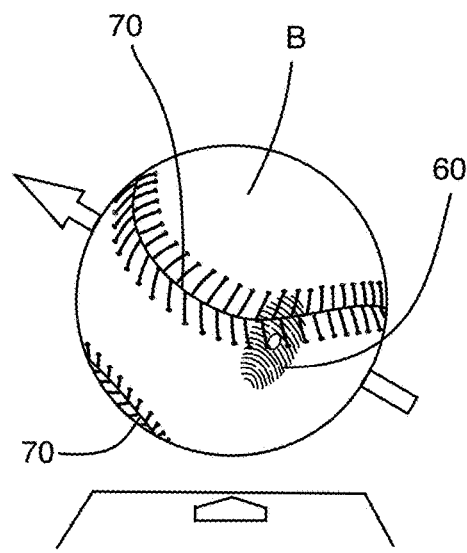

As seen in FIGS. 4A, 4B, and 4C, present invention 10 shows spin rate in revolutions per minute (RPM), spin direction in terms of hours and minutes on a clock, and the efficiency with which it spins in terms of the gyro angle with which ball B flies. Orientation of seam 70 is also fully customizable with Pitch (Latitude), Yaw (Longitude), and Turn. All these metrics come with custom sliders to enhance user U friendliness of the software, as well as a space to type in metrics for more precise inputs.

Present invention 10 also contains a few preset options for seam 70 orientations for even faster navigation consisting of left and right-handed four-seam fastballs as well as an option for a two-seam fastball. Arrows running across ball B shows the spin direction as well as the option to display a clock or 360° overlay surrounding the outer shell of ball B. When each of the fingers position point is entered in database 45 seen in FIG. 1, a virtual grip is placed on ball B with a correct spin direction, gyro degree, spin rate, and seam 70 orientation. Users U can manually place fingerprints 60 to create the virtual grip on ball B.

Present invention 10 also brings in hand measurements taken manually by users U, allow them to upload those values, and add those into the 3D Grip Calculator to show the limitations of potential grips on ball B based off of their hand size. In addition, present invention 10 is able to calculate correlations between a grip on ball B and the ballistic metrics captured by ball tracking devices to help determine what grips affect the metrics.

Figure 5A:
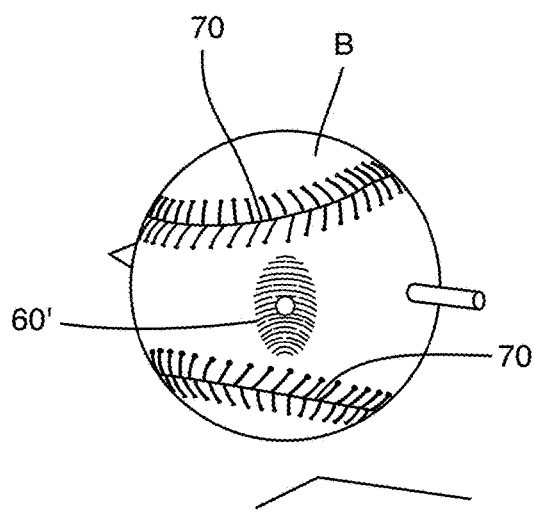
FIG. 5A is a graphical representation of the three-dimensional ball showing a first pressure applied by the finger on the ball.
Figure 5B:
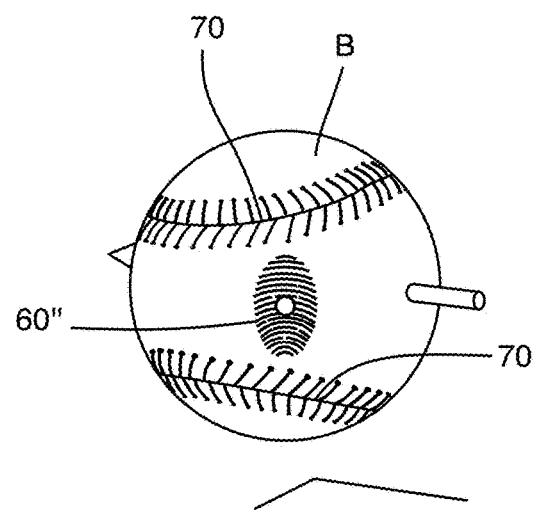
FIG. 5B is a graphical representation of the three-dimensional ball showing a second pressure applied by the finger on the ball.

As seen in FIGS. 5A and 5B, a force applied on ball B is read, whereby a location, pressure values, and heat maps are shown based on the force. Fingerprint 60' represents a first predetermined force applied to ball B and fingerprint 60" represents a second predetermined force applied to ball B.

All distances defined in present invention 10 are defined as great circles paths, which are the shortest distance between two points along the surface of ball B. In order to define these distances, the central angle between the two desired points is found first. The central angle is the angle from one point to another via the core of the baseball.

Present invention 10 may also calculate the Latitudinal (Pitch) and Longitudinal (Yaw) coordinates of the great circle midpoints between any two points of contact (vertices) on ball B. All calculations can be made with any two latitudinal or longitudinal coordinates that could be deemed significant. The points of contact are not the only points with which these calculations can be done, they are just the root of the other critical points that can be found. Therefore, all of the above calculations may be done with respect to a point of contact and a midpoint. Present invention 10 is applied either to baseball and softball games.

As seen in FIG. 6, data 20 is also represented in a three-dimensional sport field shown on the graphical user interface 30 for ball trajectory or pitches. In a preferred embodiment, data 20 is represented in a baseball field. Present invention 10 stores multiple pitches at once with the ability to navigate between them analyzing data 20.

As seen in FIGS. 7A and 7B, ring R is shown when multiple pitches are synced and shown in 2D. Synced pitches means that they are all on the same plane moving toward home plate at the same time by taking velocity out of the equation. This visual helps illustrate and compare overall pitch path movement profiles and allows for a clean UX when using the slider to move pitches back and forth. Turning on ring R when pitches are synced displays a single circle that forms by finding the outermost pitches that are selected and measuring the distance between those pitches to use as the diameter for ring R. Ring R line cuts through a center of the outermost balls B. When ring R is on, it displays the diameter of ring R as a billboard sign above it and could also show the radius, circumference, and area of ring R at any point during the path of the pitches.

Calculating the four measurements listed above in relation to the pitch types, distance from home plate, and the pitch results and/or expected results, would allow for further analysis. The PitchR 2D Sync Ring feature provides four values (diameter, radius, circumference, and area) for any group of pitches at any point in flight to use for analysis. The visual of ring R surrounding multiple pitches can help coaches and players see how ring R (pitches) changes size from release point to home plate. Depending on release location and plate location, pitches may cross paths throughout the course of flight, therefore ring R may start small, get bigger, and then decrease again as the pitches cross home plate. This would show that the release dispersion is tight, the pitches do not necessarily tunnel well at the decision making point, but end up close together. This will probably be common for pitches that mirror each other's spin direction and land in a similar location.

From a pitching or hitting standpoint, this would be a "ball-to-strike" arsenal or sequence where some pitches may look out of the zone and then come back into the zone for a strike, which are usually taken if the pitch looks like a ball inside of 28 feet. The other use case here is taking the pitches and ring visual through various "checkpoints" during flight: 40 feet, 36 feet, 28 feet, 18 feet, 5 feet (all distance from home plate). These distances have specific indications on a hitter's timing and knowing ring R measurements at these distances may be useful for further analysis as well. Maybe we even provide ring R measurements at these distances on a side panel for whatever pitches are selected when ring R is turned on. The reason we are using distances versus timing is because we removed velocity from the pitches by syncing them up together on a 2D plane as mentioned above.

Figure 8A:
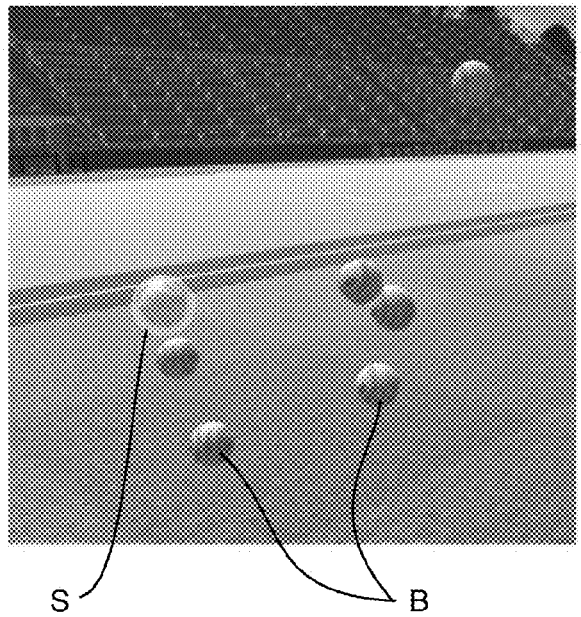
FIG. 8A is a graphical representation of a sphere shown in 3D when multiple pitches are unsynced.
Figure 8B:
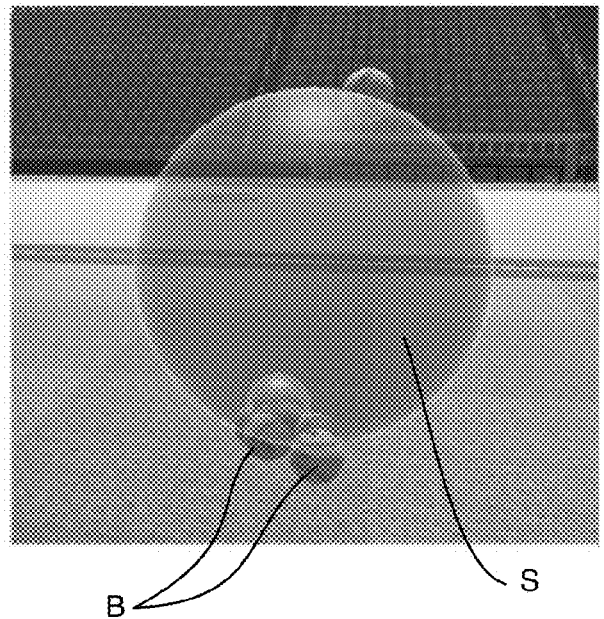
FIG. 8B is an enlarged view of the sphere.

Measurements:
Diameter, Radius, Area, and Circumference
The single Ring color should match the color and sizing scheme as the Tunneling colors:
2D diameter <12 inches=Green ring
2D diameter 12-18 inches=Yellow Ring
2D diameter 18-24 inches=Red ring
2D diameter 24+ inches=Blue ring
Billboard may be displayed in inches
When single Ring is on:
  Pitches are Synced. If the user U presses an Unsynced button, the single Ring R should turn off
  Full ring Tunnel T is disabled
  Floating ring(s) FR can be on
  Pitch Trails can be on
  Any strike zone can be turned on/off
  Pitch Height can be on for a single pitch
  The slider should default to distance measurement As seen in FIGS. 8A and 8B, sphere S is shown when multiple pitches are unsynced and shown in 3D. Unsynced pitches means that they are simulating reality by including the difference in velocity into their ball flight toward home plate. All pitches selected and shown starts at a release point, with faster pitches moving toward home plate sooner than slower velocity pitches. The Unsynced micro feature truly shows the distance in 3D as it incorporates depth from the pitching rubber to home plate and is a truer representation when comparing pitches based on velocity and timing. This is similar to how short form movement (gravity excluded) is suboptimal to long form movement (includes gravity in horizontal and vertical break) by not accurately showing the effect gravity has on slower pitches.

Short form movement charts cannot represent how breaking and off speed pitches separate from fastballs as clearly as long form movement graphs, and present invention 10 show this separation better when pitches are Unsynced. That is not to say 2D is useless, as stated above, syncing pitches on the same plane for ease of visually understanding movement and tunneling can be helpful, but does not accurately represent pitches since velocity is removed.

Users U will be able to see the timing and distance separation between faster and slower pitches and this can be shown with a sphere. Sphere S is locked to the selected and shown pitches and its size is determined by taking the furthest most pitches in the x,y,z planes and using those as sphere S boundary. As the pitches are scrolled back and forth toward home plate, sphere S will move with the pitches. We should consider showing the total volume and surface area as sphere S changes size based on where each ball B is in space. These measurements would be in addition to radius and diameter of sphere S, and circumference measurements that can be shown on a side panel. Volume and surface area measurements can be used for further analysis and should be able to be exported for a pro team.

The color of sphere S should also fall in line with the sizing and color scheme for tunneling, except using volume to determine the color of sphere S. Users U can start to see when the fastest pitch crosses home plate, how far behind the other pitches are and how big that sphere S is and be able to compare and analyze what size sphere S is optimal for each pitcher's arsenal at release, during flight, and at home plate. Certain pitch sequences and their respective pitch locations may create a size of sphere S at the front of home plate that helps illustrate why the pitcher or hitter is having more or less success and lead to further development plans.

Figure 9A:
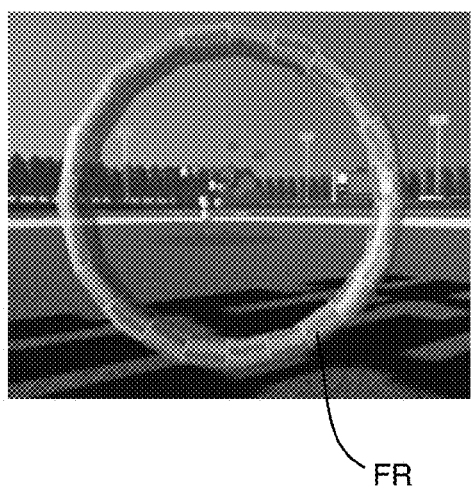
FIG. 9A is a graphical representation of a floating ring to analyze ball trajectory.
Figure 9B:
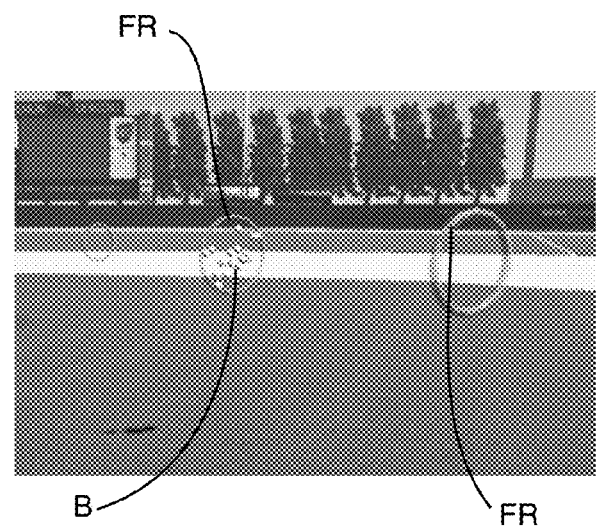
FIG. 9B is a graphical representation of a plurality of floating rings to analyze ball trajectory.

1. New Measurements
    Volume and Surface Are
        Diameter could be best to show
        Volume only good for comparing to other volumes
    Release Point Dispersion
        Pitcher specific release side
    Sphere color should be determined by Volume or Surface Area
        Use same color scheme as Rings
    When Sphere is on:
        Pitches are Unsynced. If the user presses the Synced button, the Sphere should turn off
        Full Ring Tunnel T can be on
        Floating Ring(s)
        Pitch Trails can be on
        3D Polygons—the sphere is the first iteration of the shapes that we would allow the user to choose from, so for now this is it
        Any strike zone can be turned on/off
        Pitch Height can be on for a single pitch
        The slider should default to milliseconds measurement As seen in FIGS. 9A and 9B, floating rings FR differ from the single ring R in the way that they are not attached to the pitches, and instead float on the field. Showing floating rings FR that are static in space gives a visual perception of tunneling distance benchmarks that are common in professional pitching development. Users U can turn on floating rings FR filter and select pitches from a recent bullpen or game and see which pitches passed through floating rings FR and which ones did not. This will give insight to see if opponent batted ball B results increased or decreased based on if the pitcher was tunneling through certain 6 floating rings FR. Many pitchers are trying to throw every pitch through an imaginary floating ring FR during bullpens when working on command, movement, or location, so showing live pitches on a Yakkertech in PitchR during a bullpen would bring this idea to life virtually by showing each pitch pass inside or outside of floating rings FR. The ability for each floating ring FR size and location on the field to change for each bullpen use case and each pitcher would allow for further individualization regarding a pitcher's arsenal and goals for that training or game session.

Figure 10A:
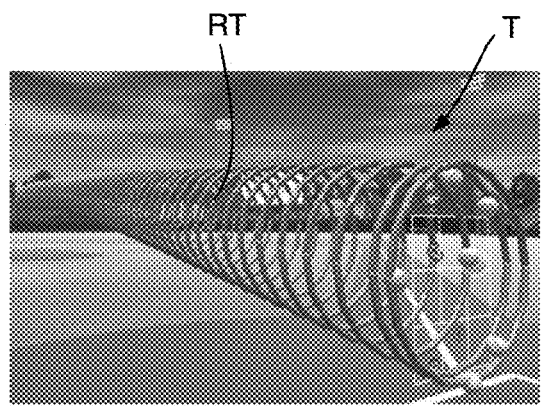
FIG. 10A is a graphical representation of a Full Ring Tunnel shown when multiple ball trajectory are selected and can be shown when pitches are Synced or Unsynced.
Figure 10B:
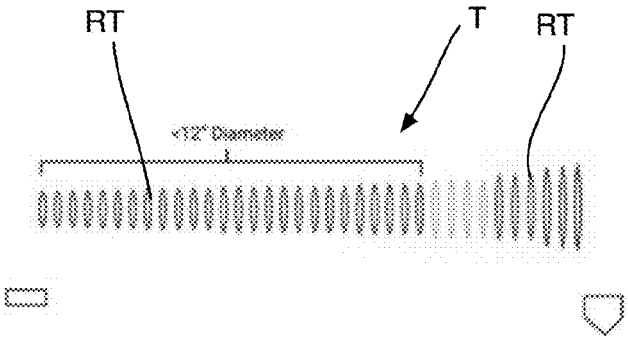
FIG. 10B is a side view of the Full Ring Tunnel showing a color scheme.

User U should have the ability to do the following with floating rings FR:
- Add or subtract a single floating ring FR
  - a present default are (2) floating rings FR showing up on the field around the 18' and 36' mark from home plate
- Change the size of each floating rings FR
  - The diameter of floating rings FR should show when the size is being changed
- Change the position of a single floating ring FR
- Change the position of multiple floating rings FR at the same time
  - UI considerations:
    1. Clicking on the ring itself and dragging it
       Hold shift+click multiple rings and drag them together
    2. A small window that shows a row for each floating ring FR with coordinates and a small up/down/left/right arrow button array that the user can click
- Save floating rings FR location to that pitcher
  - Ring positioning will be pitcher dependent
- The color of each floating ring FR should again correspond to the color and sizing scheme for tunneling:
  - 2D diameter <12 inches=Green ring
  - 2D diameter 12-18 inches=Yellow Ring
  - 2D diameter 18-24 inches=Red ring
  - 2D diameter 24+ inches=Blue ring
- When floating rings FR are on:
  - Pitches can be Synced or Unsynced
    - 2D Ring R or 3D Sphere S can be on
  - Full Ring Tunnel T is disabled
  - Pitch Trails can be on
  - Single Pitch Height is disabled As seen in FIGS. 10A and 10B, Full Ring Tunnel T is shown when multiple pitches are selected and can be shown when pitches are Synced or Unsynced. Tunnel T consists of one ring TR at every (1) foot of ball flight and is created the same as a single ring TR size is determined. Tunnel T helps users U to visually see how small ring TR is for the group of pitches selected, which signifies a tighter cluster and is harder for the hitter to distinguish pitch types and movement profiles. As the pitches move toward home plate they will most often move away from each other creating a larger and larger ring until the front of home plate. To help show how long pitches are tunneling and how tight the pitch cluster is for the selected pitches, tunnel T should follow the Tunneling color scheme outlined above.

For example, user U can see that his three selected pitches move through green rings until the 25 foot mark from home plate HP. Then the rings change color from yellow to red to blue very quickly, showing that those pitches were close together and "tunneling" past the decision point for a hitter and then quickly separated and increased the distance between pitches, which is the most basic definition for tunneling. The colored rings allow users to quickly glance at the tunnel and see how well the pitches selected tunnel with each other. The more green rings equals the longer the tunnel, but if the rings never turn to red or blue, then the pitches tunnel too well and the hitter does not have to adjust their bat path because the pitches either have similar movement or end up in the same location. The same analysis can be applied if there are very few green rings and the majority of rings are red and blue, that would mean that the pitches separate too early and will be recognized by the hitter before he has to make a decision to swing.

To help show where the pitches are located in relation to all of the rings, if the pitches are Synced in 2D, whichever ring they are passing through could light up or pulse. In Unsynced 3D, the ring that the fastest and slowest pitches (so two "end" pitches in the group) could light up or pulse to help show how far the spread is between the fastest and slowest pitch. For example, out of a three pitch mix, maybe there are 8 rings between the fastest and slowest pitch.
- Color scheme is the most important addition to the Full Ring Tunnel T
- Lighting up or pulsing the ring that pitches pass through would help users visualize where the pitches are in space, especially when in Unsynced 3D
- Hovering over ring TR with the cursor could show a billboard displaying the diameter of that ring 22
- Teams may ask for the ring size at every foot of ball flight for a given number of selected pitches
  Offer those measurements for analysis
  Export
- Comparing ring sizes and those ratios will certainly have some importance to determine which ring size ratios play the best for a given player.

Figure 11:
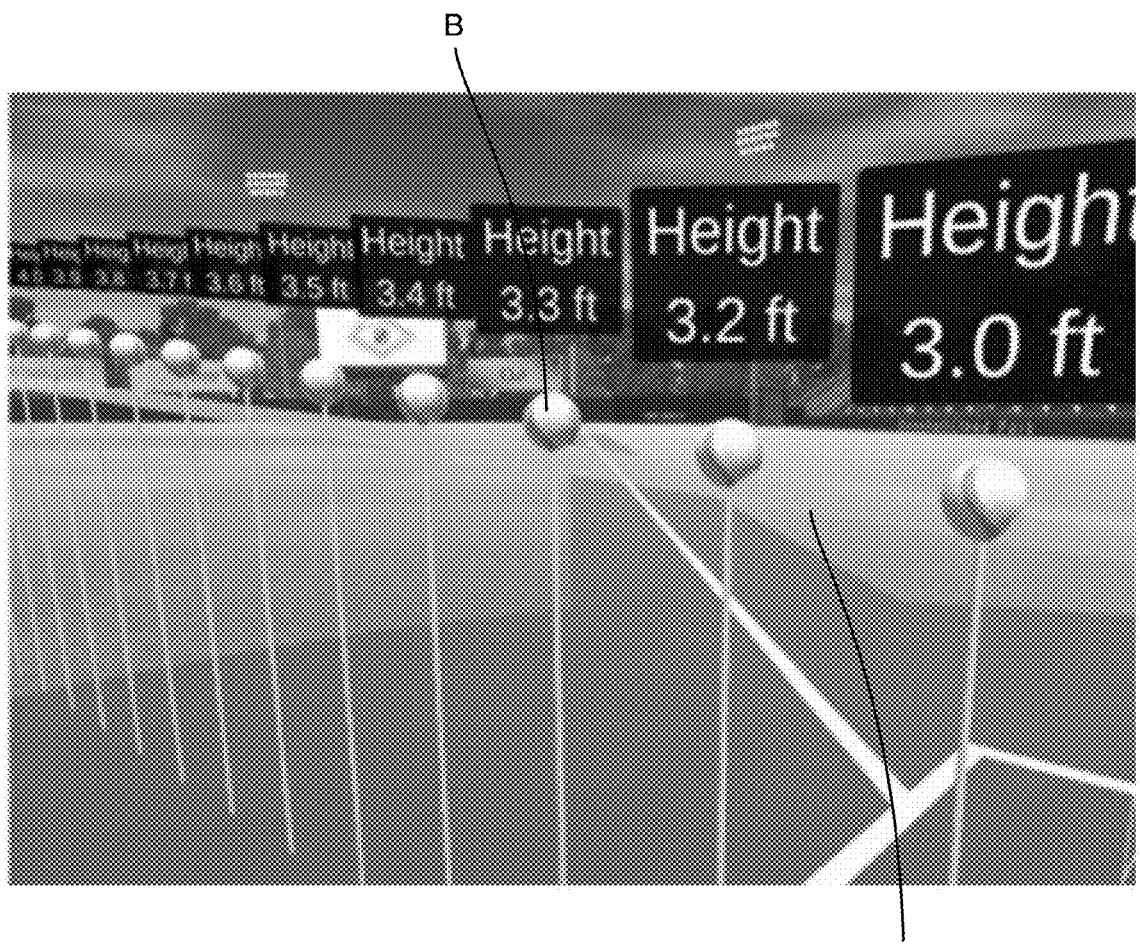
FIG. 11 is a graphical representation of a single pitch height visual showing a ball on the pitch trail at every one foot from release to home plate and a laser straight line from release to the plate location of the selected pitch.

As seen in FIG. 11, the Single Pitch Height visual shows a ball B on the pitch trail at every 1 foot from release to home plate HP and draws a laser straight laser line L from release to home plate HP location of the selected pitch. Under each ball B is a straight line that touches down to the ground with a billboard showing the height from the ground. For example, a pitch that starts at 5'5" at release and ends up at the plate at 2'5" dropped 3 feet from release to home plate HP. What this visual helps to explain is when the pitch moved the most vertically with later vertical movement usually being a positive.

In the illustrated example, the pitch may be 4'5" from the ground 10 feet away from home plate HP, so within that 10 feet of ball B flight it drops 2 feet, resulting at a plate location height of 2'5". Therefore, for every foot of ball B flight ball B was dropping 2.4" over the last 10 feet. Users U would be able to determine what pitches are moving the most vertically and the speed at which they drop over any specified distance. Laser straight line L can be used as a comparative visual that helps show the pitch movement compared to a straight line and is a common 2D visual when analyzing pitch paths.
- The laser straight line L should be thinner than the pitch trails and can be a color that is not a pitch type color.
- The pitch height visual with a billboard over each ball B should be able to toggle on/off
  Maybe it is a hover only feature or all on/all off
- The visual of showing multiple balls B along the same path can be shown without billboards When Single Pitch Height is turned on:
  Full Ring Tunnel T is disabled
  Pitches can be Synced/Unsynced
    Ring R/Sphere S can be turned on
    Floating Rings FR can be turned on As seen in FIG. 12, Measurements should also be included inside of tunnel T because of how many distances we are already calculating with the above Tunneling features. The differences between the above features and Measurements are that the visuals shown are simpler and less intuitive for drawing immediate conclusions, but provide a great foundation for analysis and terms below versus colored rings R or spheres S.

When Measurements are turned on, nothing immediately shows between the balls B. User U must click on balls B one at a time to "connect" them and find the distance between them throughout ball flight.

EXAMPLES

Click on ball B #1 and ball B #2 to connect them, as seen in FIG. 13A.
Click on ball B #2 to ball B #3 or B #3 to ball B #2 to connect them, as seen in FIG. 13B.
To disconnect, double click on ball B #2 and click the X next to the measurement that should be removed. When an X is 14 pressed, the other X's disappear until any ball B is double clicked again. As seen in FIG. 13 C, as an example, ball B #2 is double clicked, and user U can then remove the distance between ball B #2 and ball B #1 or between ball B #2 and ball B #3.
Choose any ball B, click on it and them click on another ball B to connect them, as seen in FIG. 13D.
Wrong: User U connects ball B #1 to ball B #2, and ball B #2 to ball B #3 and ball B #1 to ball B #3 was automatically connected. User U needs to connect ball B #1 to ball B #3 in order to see that distance, as seen in FIG. 13E.
User U cannot connect balls B to form a triangle if only two sides have been purposefully connected. User U needs to be responsible for choosing which ball B they connect in order to see the distances. 7
There are advanced calculations that have been described in public articles regarding tunneling, but most of them revolve around the hitter's perceived distance between two pitches. Present invention 10 can calculate the actual distance throughout ball flight with the 9P Fit data. With an optical tracking solution that provides ball B flight data, such as "YAKKERTECH"'s advanced ball flight model, present invention 10 ball flight will not be all parabolas, but will show how the pitches actually moved incorporating weather and seam-shifted wakes (SSW) concepts.
Some of the key points throughout the pitch path that matter to pitchers and hitters are the following:
  Pitch Recognition Point-100 ms post release
  Gauging Area-125 ms (between PRP and CP)
  Commitment Point-175 ms before home plate
  Average Swing Speed-150 ms
Based on the above points and distances calculated throughout ball flight, these are a few metrics that we can calculate:
  RD (Release Distance)—Difference between two pitches at release (Major League Baseball (MLB) Avg. is 2.6")
    We show this with rings, spheres, and a line between two pitches. The line between two pitches can be compared to the MLB Avg. of approximately 2.6"
  DMPD (Decision Making Point Distance)—distance between two pitches at decision making point
    This is NOT measuring the actual distance between two pitches, but the distance from the batter's point of view. Present invention 10 uses the actual distance between two pitches at the decision making point.
  PST (Pitch Separation Time)—greatest separation between the second pitch to the first pitch (Unsynced) Tells you how much remaining flight time is left before it reaches home plate. (MLB Avg. 169 ms)
    This is simply finding the spread between the first and second pitch in time instead of distance. When the first pitch crosses home plate how far away is the second pitch? The value of this metric will always be positive as we are finding the time difference between the faster and slower pitch. This incorporates the release point since a slower pitch may be thrown closer to home plate (ie. curveball) while a faster pitch (ie. fastball) may be thrown closer to the rubber. Take the zone time and compare.
  PD (Plate Distance)—distance between two pitches at the front of home plate (MLB Avg. 18.2").
    This is calculating the distance between two pitches as they cross home plate. Present invention 10 does this with measurement and can compare to the MLB average.
  FTP (Flight Time Differential)—delta between the first and second pitch total flight time to compare to the MLB average that is presently approximately 26 ms.
    This is calculating the difference between total flight time without release point. If pitch #1 is 400 milliseconds and pitch #2 is 450 milliseconds then the FTT=50 milliseconds.
  PPMR (Plate PreMax Ratio)—ratio from DMPD to Plate Distance (front of home plate) (MLB Avg. 11.9 (11× greater)
    Present invention 10 calculates this ratio. Distance between two pitches at decision making point vs the distance between those pitches at home plate.
  SVPR (Sphere Volume Plate Ratio)—the ratio between the volume of the sphere from multiple pitches selected at the decision making point (first pitch that gets there based on time, so 175 ms before home) to the total volume of the selected pitches sphere when the first pitch crosses home.

Figure 14A:
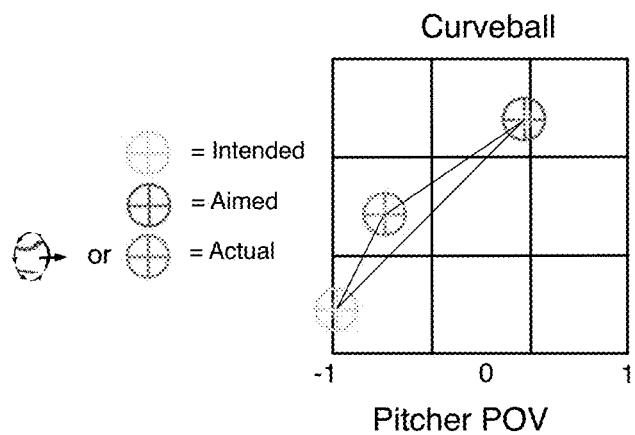
FIG. 14A is a representation of the basics for Intended Location.
Figure 14B:
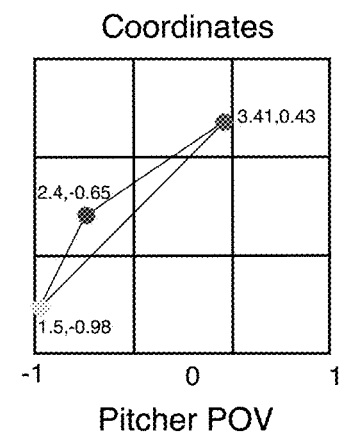
FIG. 14B is a representation of the ball coordinates.

FIGS. 14A, 14B, and 14 C, lay out the process and illustrates the basics for Intended Location. Intended Location has a few main sub features starting with the Strike Zone Visual UI/UX. The Coordinate System, Intended Location, and Aimed Location are defined as following:
  Coordinate System: the plate location height and plate location side values in feet determine the position of ball B when it crosses the front of home plate HP, seen in FIG. 15. The middle of the strike zone is 2.5, 0.0, which means it is 2.5 feet off the ground and directly in the center of home plate at 0.0. The first value denotes the height of ball B and the second value indicates which side of the plate ball B is located.
  Intended Location: a singular spot inside or outside of the strike zone that the pitcher wants ball B to pass through when it crosses home plate HP. The plate location height and plate location side coordinates define the singular spot.

The Intended Location is shown by the Yellow Scope with coordinates 1.5-0.98.

Aim Location (Focal Point): a singular spot where the pitcher focuses or aims to throw the pitch factoring in the pitch's movement so that it ends up at the intended location.

The Aim Location is shown by the Red Scope with coordinates 3.41, 0.43.

As is illustrated in FIGS. 14A and 14B, −1 is toward a left handed batter and 1 is toward a right handed batter. It is also important to note that the strike zone and home plate visuals must line up perfectly for Intended Location. This may require a new 9 box strike zone.

Figure 14C:
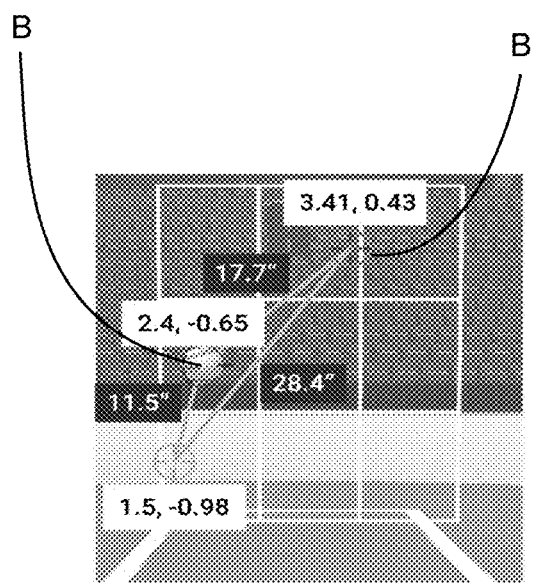
FIG. 14C is a representation of the Actual Pitch Location, Intended Location, and Aim Location.

As seen in FIG. 14C, the Strike Zone visual for Intended Location should consist of the following:
Yellow Scope (Intended Location)
Red Scope (Aim Location)
Coordinate Billboards (can toggle to stay on) it is shown as white box with black lettering.
  Actual Pitch Location
  Intended Location
  Aim Location
Distance Billboards (can toggle to stay on) it is shown as black box with white lettering.
  Actual Pitch Location to Aim Location
  Actual Pitch Location to Intended Location
  Intended Location to Aim Location In order to add Intended and Aim Locations to a pitch after the event, user U would go through the following UX:
1. Open the Pitch by Pitch window
2. Click on the "Command Mode" button in the Pitch by Pitch panel header (TBD look)
   a. A brief pop up saying "Command Mode Enabled" should appear in the middle of the screen so user U knows they 14 are in Command Mode.
   b. Once in Command Mode all of the pitches and batted balls that were shown will be cleared and Tunnel T features will be disabled. 18
   c. The strike zone will switch to the 9 box zone with the yellow and red scopes in the top corners.
   d. To exit Command Mode, click the same button again. A brief pop up saying "Command Mode Disabled" should appear in the middle of the screen
      i. If user U drags locations for a pitch and tries to exit before saving those locations, a pop up should appear asking the user if they want to save the locations or discard. They can also cancel and resume in Command Mode.
3. When in Command Mode, select a pitch and the pitch will be thrown toward home plate. The pitch should stop at the front of home plate. Only one pitch can be selected at a time.
4. Click and drag the yellow and red scopes respectively to set Intended and Aim location.
   a. The Coordinate Billboards for all locations should default to on.
      i. User U can switch the default to OFF or On Hover
   b. The Distance Billboards for all three measurements should default to on.
      i. User U can switch the default to OFF or On Hover
   c. Once a scope has been dragged, a window should pop up that prompts user U to save the selected locations.
   d. When user U clicks the "Save Location(s)" button, the next pitch in the Pitch by Pitch window should be thrown.
   e. To navigate to a previous pitch, click the row in the Pitch by Pitch panel. If locations have been set and saved for that pitch, the scopes should show up in their respective spots.
5. Once user U has set locations for all desired pitches they can exit out of Command Mode by clicking the Command Mode button in the Pitch by Pitch panel header.

Figure 15:
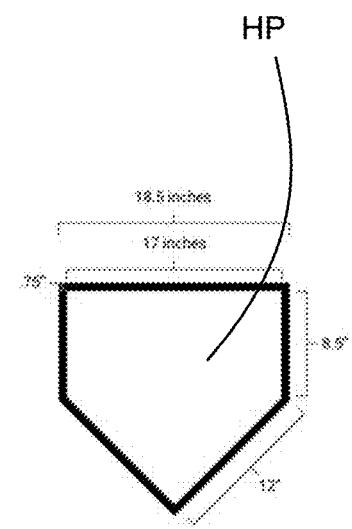
FIG. 15 is a representation of a home plate.

As seen in FIG. 15, home plate HP is 17 inches wide plus a strip of black that is 0.75" on either side, which totals 18.5 inches. From the center of home plate HP to the outside edge including the black the distance is 9.25 inches.

What is also important for Intended Location is for the Intended Location and Aimed Location scope to go outside of the outlined strike zone. The pitcher may have been trying to throw a ball on purpose, so we do not want to limit where the scopes can be placed and locked in.

Figure 16:
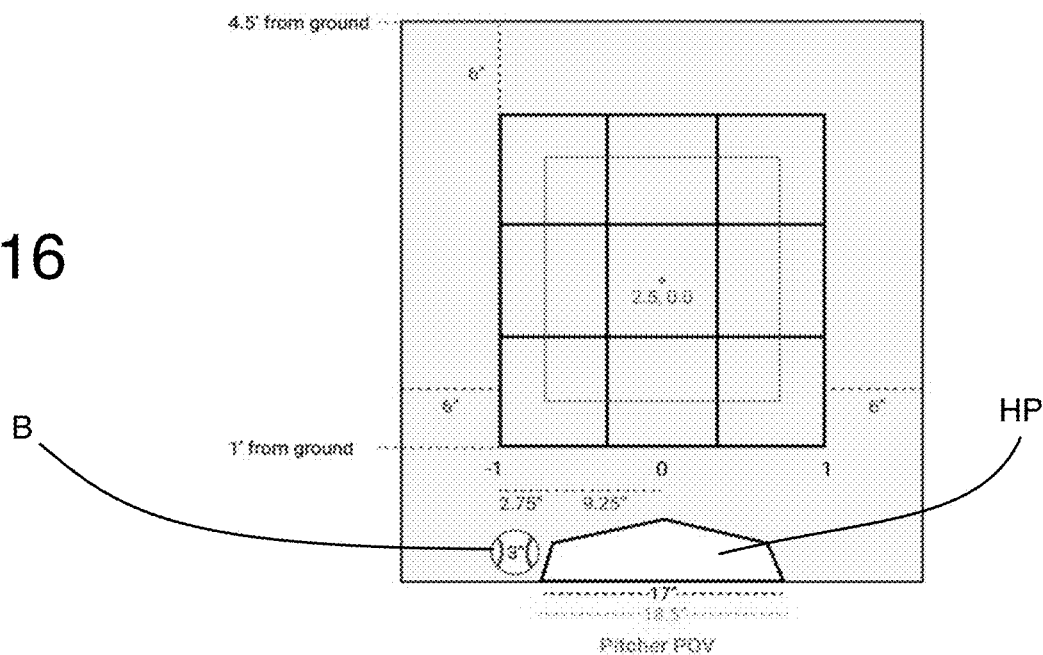
FIG. 16 is a representation of the area in which the scopes should be able to be placed as the strike zone.

As seen in FIG. 16, the area in which the scopes should be able to be placed is defined as the grey rectangle. The other measurements are all for reference with the red outline representing the strike zone at 17 inches across.

The moveable area (grey box) for the Intended and Aimed scopes stop at the ground. Although pitches intend to throw a pitch that bounces in front of home plate HP would have to then calculate in 3D space vs 2D space and the scope would have to switch planes. In a preferred embodiment, the scopes moveable are keep on a 2D plane. It can be explored 3D location spaces with Yakkertech's ball B flight model and point of contact location comes into play.

Figure 17A:
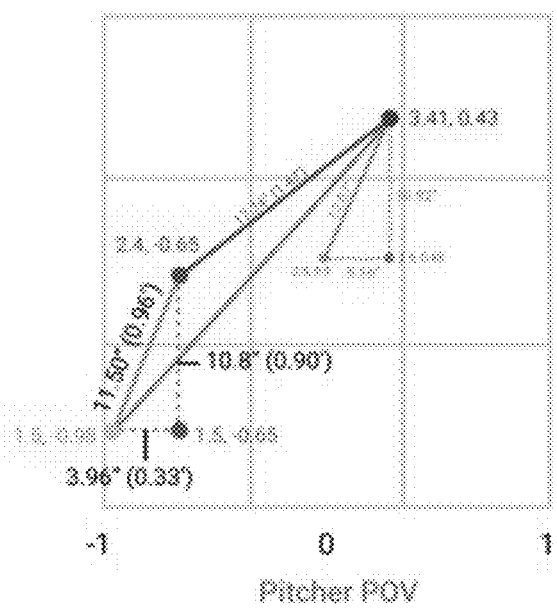
FIG. 17A is a representation of the intended location analysis.
Figure 17B:
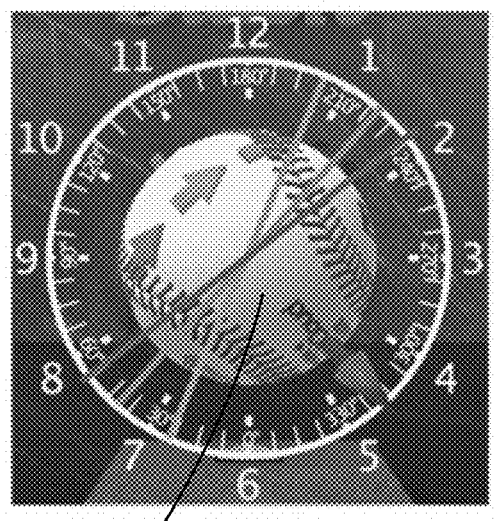
FIG. 17B is a representation of the intended location analysis showing angles.
Figure 18:
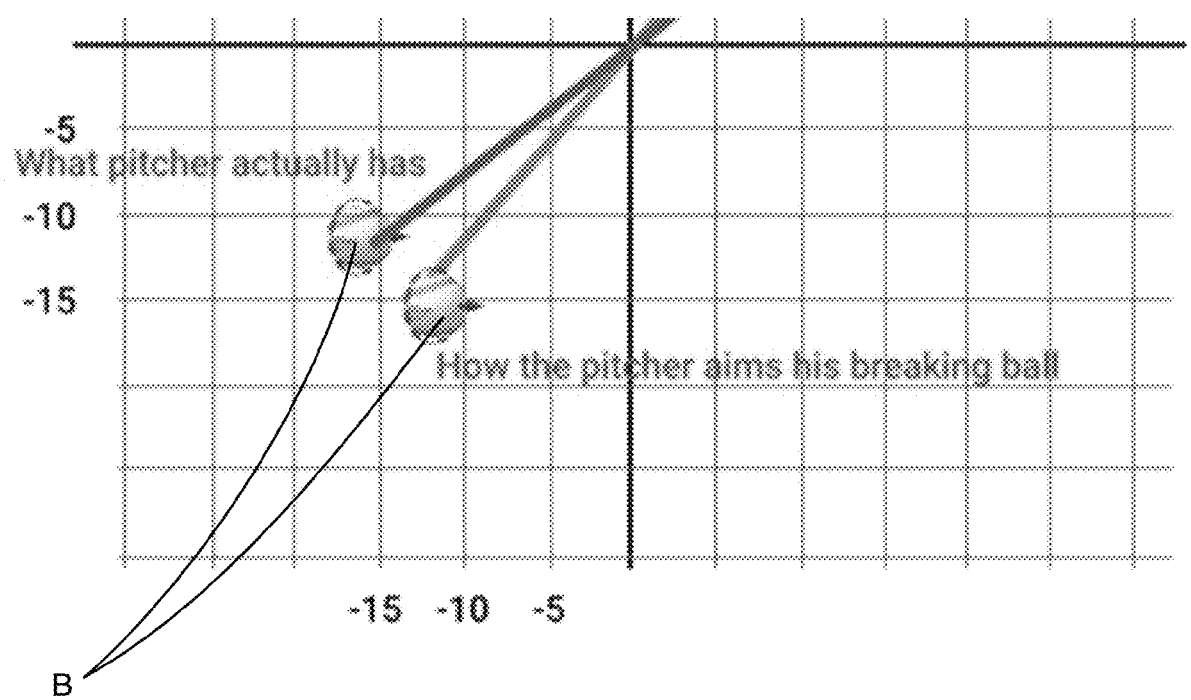
FIG. 18 is a representation of an analysis of a pitch.

As seen in FIGS. 17A, 17B and 18, an intended location analysis is carried out as follows:
Intended Location Analysis
  How far did the pitcher miss his spot?
  Int_v_actual
    Distance between intended location and actual location
  Aim_v_int
    Distance between aim location and intended location
  Aim_v_actual
    Distance between aim location and actual location
  Does the aim location match the movement of the pitch?
Angle_int_v_actual
  The angle of the line that connects the intended location and actual location
  As seen in FIGS. 17A and 17B:
  The Green Line represents the line from Intended Location to the Actual Pitch Location. The angle for this line can be read as 203° or 23° depending on the pole.
Angle_aim_v_int
  The angle of the line that connects the aim location to the intentend location
    This angle can be compared to the angle of total break and the spin direction for pitches that have a high amount of spin efficiency and most of their movement is due to Magnus
    This line is indicated in FIG. 17B with a red line and has an angle of 221° or 41° 8
Angle_aim_v_actual
  The angle of the line that connects the aim location to the actual location. This angle could be significant as we can see if the pitcher is simply aiming or their focal point does not match their intended location and find the difference with the actual location.
    Example as seen in FIG. 17B as the blue line with angle 233° or 53°

Example as seen in FIG. 18:

The pitcher may be aiming as if his pitch has a different type of movement and therefore his command or control will continue to be off The blue and red lines are the lines (angles) from above The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. System for three dimensional representation of sports data from multiple sources, comprising:
   A) a computer program stored on a non-transitory computer readable medium;
   B) a server operatively associated with said non-transitory computer readable medium;
   feature detection C) a computer vision model using algorithms;
   D) a database associated to said computer vision model;
   E) data to upload to said database, said data is from at least one data source selected from the group consisting of radars, optical-tracked ball flight, wearable and non-wearable sensors, force-accepting and force-measuring hardware, said data from said database passes through said computer vision model to detect hand and fingers position points, spin direction, and seam orientation on a ball, said computer vision model extracts a location of each individual finger on said ball in relation to said seam orientation and export coordinates to said database;
   F) a graphical user interface to show data; and
   G) a computer device whereby users access to said graphical user interface to upload and visualize said data.

2. The data aggregation from multiple sources for use in data analysis, set forth in claim 1, wherein said data is visually shown through two-dimension and three-dimension images, text, numbers, animations, and custom visuals to allows said users to analyze said data.

3. The three dimensional representation of sports data from multiple sources set forth in claim 1, wherein said users are able to pull said data from said database by requesting metric parameters, whereby grips that fit that criteria are shown through two dimensional and three dimensional grip display.

4. The three dimensional representation of sports data from multiple sources set forth in claim 1, wherein said computer vision model further locates and identifies a gyro degree, and a spin rate of said ball.

5. The three dimensional representation of sports data from multiple sources set forth in claim 1, wherein said computer vision model comprises a coordinate system having a method to locate said hand and fingers position points on said ball.

6. The three dimensional representation of sports data from multiple sources set forth in claim 5, wherein said data and said coordinate system are represented on said graphical user interface through a three-dimensional ball having seams.

7. The three dimensional representation of sports data from multiple sources set forth in claim 5, wherein said coordinate system comprises pitch values, and yaw values to act as latitude and longitude markers on said ball.

8. The three dimensional representation of sports data from multiple sources set forth in claim 5, wherein said coordinate system uses three rotations to display said seam orientations in relation to the spin axis of said three dimensional ball, whereby said pitch values, said yaw values, and turn values are used to rotate said ball around three different axis respectively.

9. The three dimensional representation of sports data from multiple sources set forth in claim 1, wherein when each of said fingers position point is entered in said database, a virtual grip is placed on said ball with the correct said spin direction, said gyro degree, said spin rate, and said seam orientation.

10. The three dimensional representation of sports data from multiple sources set forth in claim 1, wherein values of distance, angle, surface area, and perimeter of two or more of said finger location points on said ball are measured and calculated.

11. The three dimensional representation of sports data from multiple sources set forth in claim 1, wherein a force applied on said ball is read, whereby a location, pressure values, and heat maps are shown based on said force.

12. The three dimensional representation of sports data from multiple sources set forth in claim 1, wherein said data is represented in a three-dimensional sport field shown on said graphical user interface for ball trajectory.

13. The three dimensional representation of sports data from multiple sources set forth in claim 12, wherein said data is represented on said graphical user interface through a floating ring or a ring in two dimensional form when multiple of said pitches are synced providing diameter, radius, circumference, and area for any group of said pitches at any point.

14. The three dimensional representation of sports data from multiple sources set forth in claim 12, wherein said data is represented on said graphical user interface through a sphere in three dimensional form when multiple of said ball trajectory are unsynced.

15. The three dimensional representation of sports data from multiple sources set forth in claim 12, wherein said data is represented on said graphical user interface through a full ring tunnel following a tunneling color scheme for multiple of said ball trajectory synced or unsynced.

16. The three dimensional representation of sports data from multiple sources set forth in claim 12, wherein said user analyzes said data for said ball trajectory represented on said graphical user interface through measurements of said balls according to an intended location and an aim location.

17. The three dimensional representation of sports data from multiple sources, set forth in claim 1, wherein said users access to said graphical user interface and upload said data through a computer based communication.

18. The three dimensional representation of sports data from multiple sources set forth in claim 1, wherein said three-dimensional representation of sports data is shown on web applications, mobile applications, and extended reality devices.

* * * * *